2,889,286

NICKEL-TITANIUM CATALYSTS

Seymour Faulkner, Summit, N.J.; Alice M. Faulkner, executrix of said Seymour Faulkner, deceased, assignor to E. F. Drew & Co., Inc., a corporation of Delaware No Drawing. Application May 13, 1955
Serial No. 508,291

16 Claims. (Cl. 252—455)

The present invention is directed to nickel catalysts adapted for hydrogenation, and more particularly to such catalysts promoted with titanium and to a method of making such catalysts.

For many years finely nickel deposited on a carrier has been used in hydrogenation procedures, such as the saturation or hydrogenation of vegetable and animal glyceride oils and fats. More recently attempts have been made to increase the activity of the nickel and for this purpose other metals having a promoter action have been incorporated in the catalysts. Such additions did increase the activity of the nickel but still left much to be desired in this respect. Among such promoter metals there was suggested the use of titanium but all attempts to use this metal as a promoter failed to produce a commercially acceptable product. In a prior art process an aqueous solution of a nickel salt and a salt of a promoter metal was heated to the boiling point, the solution was stirred and a finely divided carrier of crushed pumice stone added. After absorption of the salts on the carrier was complete, the mass was calcined at 400° C. The product was then reduced at 400° C. in a stream of hydrogen. If the promoter metal was titanium, the activity of the resulting catalyst was extremely low, so that for commercial purposes it could not be used.

In view of the prior art, the present invention is intended and adapted to overcome the difficulties and disadvantages thereof, it being among the objects of the invention to provide a superior catalyst of the promoted nickel type.

It is also among the objects of the invention to provide a nickel-titanium catalyst having a high degree of activity in use for the hydrogenation of organic compounds, such as the unsaturated animal and vegetable oils.

It is further among the objects of the invention to provide a process of producing a catalyst of the type described which is simple and effective, and which gives consistently high activity of the resulting catalyst.

In practicing the present invention, there is provided an aqueous solution of a nickel salt, such as nickel sulphate. There is also provided a solution of an alkali metal carbonate, which is usually sodium carbonate. The titanium compound used in the process is a soluble salt, such as the sulphate; preferably the aqueous solution of said salt is rendered acid, usually by the addition of sufficient sulphuric acid to lower the pH to about 2.5, thereby facilitating the solution of the titanium sulphate. A finely divided carrier is used, and preferably it is a natural, untreated diatomaceous earth.

The procedure comprises adding the diatomaceous earth to the solution of alkali metal carbonate and stirring the solution to uniformly distribute the earth throughout. While this operation may be conducted at room temperatures, better results are obtained if the temperature is about 35° to 45° C. Then, while maintaining this temperature, the solution of the titanium salt is added with stirring to obtain uniform distribution. After this is complete, the nickel salt solution is added with stirring, and the reaction mass is held at an elevated temperature for a short time, usually for 5 to 15 minutes and preferably at about 75° to 95° C.; during this period coprecipitation of the nickel and titanium on the diatomaceous earth takes place.

It is important that no long period of standing of the precipitate take place, and continued stirring is detrimental. The freshly precipitated material is filtered and washed. It is believed that the success of the operation is due to the initial precipitate of the titanium being in the form of an unstable hydrated oxide or carbonate which, in the presence of the soluble salts and particularly if the mass is stirred or stands for a long time, such as 12 to 24 hours, loses water and is transformed into the stable titanium oxide, which does not impart the desired activity or promoter effect to the nickel catalyst. On the other hand, the unstable form as produced in accordance with the present process, is readily reducible in the next stage of the operation, whereas the stable oxide does not reduce well.

The washed precipitate is then dried and is reduced at a suitable temperature by a stream of hydrogen. The reduction may take place at temperatures ranging from 350° to 475° C.; at the lower temperatures there is required about 2.5 hours while at the higher temperatures about 1 hour is sufficient. The catalyst is highly active and ranges above 7 with peanut oil.

Various proportions of the reactants may be used but the best results are obtained when the amount of the alkali metal carbonate is somewhat in excess of that theoretically necessary to precipitate all of the nickel and titanium. Specifically the excess is about 3 to 5%. It is also important that the pH of the final solution, after the precipitation is complete, be above 7.0 and preferably in the range of about 7.4 to 7.7. The ratio of catalyst metal to the earth carrier is preferably about one of said metal to 0.5–1.0 of the carrier. The nickel is present in relatively large proportion, being about 5.4–6.8 to 1.0 of the titanium by weight.

The invention is further illustrated by the specific examples set forth below:

Example 1

60 grams of sodium carbonate (105% of theory) are dissolved in 600 cc. of water. To the solution is added with stirring 14 grams of untreated diatomaceous earth (Filtercel) while maintaining a temperature of 40° C. 111 cc. of a 4% solution of acidified titanium sulphate are added slowly to the mixture in about one-half hour, the mass being continuously agitated, whereby precipitation occurs, the precipitate redissolving in the excess of sodium carbonate solution.

A solution of 108 grams of nickel sulphate (containing 24 grams of nickel) dissolved in 500 cc. of water is added to the mass while stirring and maintaining a temperature of 40° C. The temperature is now raised to 85°–90° C. and the mass held for about 15 minutes. The pH of the solution is about 7.4. It is immediately filtered, washed and dried. The ratio of nickel to titanium is 5.7 to 1.0.

The catalyst is placed in a reduction vessel and held at a temperature of about 350° C. for two and one-half hours, while a stream of hydrogen is passed therethrough to complete the reduction. Peanut oil is hydrogenated with this catalyst by the standard procedure, the catalyst having an activity of 6.7. The selectivity is under 24 with good color and a hydrogenation time of about 10–11 minutes to harden cottonseed oil to a 23.5 congeal point and a 70. iodine value.

Example 2

The titanium sulphate solution of Example 1 is added to the sodium carbonate solution (5% excess) and the diatomaceous earth is stirred into the same. The temperature is held at 38° C. and the nickel solution is stirred in, after which it is increased to 90°–94° C. and held at this temperature for 15 minutes, the final pH being 7.5. Immediately thereafter the precipitate is filtered, washed and dried. It is reduced in hydrogen at 400° C. for about 2.5 hours, showing an activity of 6.8 with peanut oil. The ratio of nickel to titanium is 6.5 to 1.0.

*Example 3*

In an operation similar to Example 1, the sodium carbonate, diatomaceous earth, titanium sulphate and nickel sulphate are treated as described. The temperature is raised to 90°–94° C. and is held for 15 minutes, the final pH being 7.6. After filtering, washing and drying, the catalyst is reduced at 400° C. for 2.5 hours. It shows an activity of 7.7 with peanut oil.

*Example 4*

An operation is conducted similar to that of Example 3, in which the ratio of nickel to titanium is 6.7 to 1.0. The pH of the final reaction mass is 7.4. The activity of the catalyst with peanut oil is 6.4.

*Example 5*

The procedure of Example 1 is repeated with the use of 0.5 part of the diatomaceous earth to 1.0 part of the total catalyst metals. The precipitated mass is filtered, washed, dried and reduced. When reduced at temperatures between 350° and 450° C. for 1.5 hours, the activity thereof in the hydrogenation of peanut oil is 6.1–6.2. When reduced at a temperature of about 350° C. for 2.5 hours the activity is 6.7 on peanut oil.

The above examples illustrate the nature of the invention. If the pH of the reacted mass is substantially above 7.7, titanium redissolves and is lost. If the slurry is agitated for a relatively long time or is allowed to stand, then the activity of the resulting catalyst is so low as to be unusable. The selectivity of the catalyst is quite favorable, the congeal point of cottonseed oil being about 20.6°–22.2° C. upon hydrogenation for 12–14 minutes.

The "activity" referred to is measured by the following test:

400 gms. of refined bleached peanut oil is weighed out and put into a stainless steel mechanically agitated electrically heated hydrogenation machine. Hydrogen gas flows into the machine. The oil is preheated to 150° C. and then .03% of the nickel catalyst to be tested is added. Agitation is started and the temperature not allowed to exceed 165° C. while the test proceeds for 30 minutes. The test is stopped and the iodine value drop measured. The iodine value drop is divided by 6 and this resultant number is the activity number. The case of an activity of 7 means $7 \times 6 = 42$ iodine value drop in 30 minutes.

I claim:

1. A method of making a nickel-titanium hydrogenation catalyst which consists essentially in providing an aqueous solution of an alkali metal carbonate and a water-soluble titanium salt, said solution having distributed therethrough a finely divided carrier, adding thereto with agitation an aqueous solution of a water soluble nickel salt, the ratio of nickel to titanium being from about 5.4–6.8 to 1 by weight, and the carbonate being in amount to precipitate substantially all of the nickel and titanium, raising the temperature of the reaction mixture to above 45° C. and below about 95° C. to coprecipitate the nickel and titanium, and within a short time while the titanium is in unstable hydrated form filtering and washing the precipitate.

2. A method as set forth in claim 1 in which the filtering and washing is within 5 to 15 minutes of coprecipitation.

3. A method as set forth in claim 1 in which the amount of carbonate is from 3 to 5% by weight in excess of that necessary to precipitate all nickel and titanium.

4. A method as set forth in claim 1 in which the ratio of nickel to titanium is from 5.7–6.4 to 1.

5. A method as set forth in claim 1 in which the final pH is from 7.4 to 7.7.

6. A method as set forth in claim 1 in which the titanium salt is titanium sulphate.

7. A method as set forth in claim 1 in which the carrier is untreated diatomaceous earth.

8. A method as set forth in claim 1 in which the carrier is used in the ratio to total nickel and titanium of 0.5–1.0 to 1.0.

9. A method as set forth in claim 1 in which the coprecipitate is reduced with hydrogen at a temperature of about 350 to 475° C.

10. A method as set forth in claim 1 in which the carrier is diatomaceous earth, the titanium salt is the sulphate and the nickel salt is the sulphate, the temperature is raised to between 75 and 95° C. for coprecipitation, and the coprecipitate is immediately filtered and washed.

11. A method as set forth in claim 1 in which the reduction is carried out with hydrogen at 400° C. ±25° C. for 1.5 to 2.5 hours.

12. A method as set forth in claim 6 in which the titanium sulphate has a pH of 2.5.

13. A method as set forth in claim 10 in which the alkali metal carbonate is at a temperature of from 35 to 45° C.

14. A method as set forth in claim 10 in which the reaction mixture is agitated throughout coprecipitation.

15. A method as set forth in claim 10 in which the coprecipitate is reduced with hydrogen at a temperature of from about 350 to 475° C.

16. A method as set forth in claim 15 in which the reduction is carried out for about 0.5 to 3.0 hours to obtain maximum activity of catalyst.

References Cited in the file of this patent

UNITED STATES PATENTS

| | | |
|---|---|---|
| 2,257,278 | Schaumann | Sept. 30, 1941 |
| 2,338,119 | Kroenig et al. | Jan. 4, 1944 |
| 2,687,370 | Hendricks | Aug. 24, 1954 |
| 2,691,037 | Bellringer | Oct. 5, 1954 |